United States Patent
Panje et al.

(10) Patent No.: US 11,811,840 B2
(45) Date of Patent: *Nov. 7, 2023

(54) UHD HLS STREAMING TRUSTED CLIENT SERVER ENVIRONMENT

(71) Applicant: ARRIS Enterprises LLC, Suwanee, GA (US)

(72) Inventors: Krishna Prasad Panje, Bengaluru (IN); Surya Prakash Maheswaram, Bengaluru (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/946,369

(22) Filed: Sep. 16, 2022

(65) Prior Publication Data

US 2023/0055310 A1 Feb. 23, 2023

Related U.S. Application Data

(63) Continuation of application No. 17/344,305, filed on Jun. 10, 2021, now Pat. No. 11,483,364.

(Continued)

(30) Foreign Application Priority Data

Jul. 19, 2020 (IN) .............................. 202031030760

(51) Int. Cl.
*H04L 65/70* (2022.01)
*H04N 21/61* (2011.01)
(Continued)

(52) U.S. Cl.
CPC .............. *H04L 65/70* (2022.05); *G06F 21/10* (2013.01); *G06T 1/005* (2013.01); *H04L 65/65* (2022.05);
(Continued)

(58) Field of Classification Search
CPC ......... H04L 65/70; H04L 65/65; G06F 21/10; H04N 21/6118; H04N 21/8358
See application file for complete search history.

(56) References Cited

U.S. PATENT DOCUMENTS

2013/0268759 A1* 10/2013 Blankenbeckler ...... G06F 21/10
713/168
2014/0044258 A1* 2/2014 Grewal .............. H04N 21/2541
380/200

(Continued)

*Primary Examiner* — Chris Parry
*Assistant Examiner* — Dixon F Dabipi
(74) *Attorney, Agent, or Firm* — Wenderoth, Lind & Ponack, L.L.P.

(57) ABSTRACT

A video player for playing a video stream that receives a master playlist identifying at least one variant playlist identifying a video file encoded as a series of video frames that when decoded provide the video stream. The video player based upon a configuration tag in the master play list selectively determining whether the video file is to be processed in a trusted execution environment. The trusted execution environment of the video player selectively includes at least one of (i) hack one, only hack one; (ii) output and link protection; (iii) hardware root of trust; and (iv) forensic watermarking, and decrypts and/or decodes the video stream in such an environment.

20 Claims, 11 Drawing Sheets

Related U.S. Application Data

(60) Provisional application No. 63/078,513, filed on Sep. 15, 2020.

(51) Int. Cl.
    *G06F 21/10*     (2013.01)
    *G06T 1/00*     (2006.01)
    *H04N 21/8358*     (2011.01)
    *H04L 65/65*     (2022.01)

(52) U.S. Cl.
    CPC ..... *H04N 21/6118* (2013.01); *H04N 21/8358* (2013.01)

(56) References Cited

U.S. PATENT DOCUMENTS

2014/0196079 A1* 7/2014 Jannard ............ H04N 21/26613
    725/31
2014/0344575 A1* 11/2014 Saremi .................. H04L 63/061
    713/168
2019/0069036 A1* 2/2019 Afshar ............. H04N 21/26258

* cited by examiner

MASTER PLAYLIST

```
#EXTM3U
#EXT-X-STREAM-INF:BANDWIDTH=150000,RESOLUTION=416x234,CODECS="avc1.42e00a,mp4a.40.2"
http://example.com/low/index.m3u8
#EXT-X-STREAM-INF:BANDWIDTH=240000,RESOLUTION=416x234,CODECS="avc1.42e00a,mp4a.40.2"
http://example.com/lo_mid/index.m3u8
#EXT-X-STREAM-INF:BANDWIDTH=440000,RESOLUTION=416x234,CODECS="avc1.42e00a,mp4a.40.2"
http://example.com/hi_mid/index.m3u8
#EXT-X-STREAM-INF:BANDWIDTH=640000,RESOLUTION=640x360,CODECS="avc1.42e00a,mp4a.40.2"
http://example.com/high/index.m3u8
#EXT-X-STREAM-INF:BANDWIDTH=64000,CODECS="mp4a.40.5"
http://example.com/audio/index.m3u8
```

FIG. 3

VOD PLAYLIST

```
#EXTM3U
#EXT-X-PLAYLIST-TYPE:VOD
#EXT-X-TARGETDURATION:10
EXT-X-VERSION:4
#EXT-X-MEDIA-SEQUENCE:0
#EXTINF:10.0,
http://example.com/movie1/fileSequenceA.ts
#EXTINF:10.0,
http://example.com/movie1/fileSequenceB.ts
#EXTINF:10.0,
http://example.com/movie1/fileSequenceC.ts
#EXTINF:9.0,
http://example.com/movie1/fileSequenceD.ts
#EXT-X-ENDLIST
```

FIG. 4

EVENT PLAYLIST

```
#EXTM3U
#EXT-X-PLAYLIST-TYPE:EVENT
#EXT-X-TARGETDURATION:10
EXT-X-VERSION:4
#EXT-X-MEDIA-SEQUENCE:0
#EXTINF:10.00,
fileSequence0.ts
#EXTINF:10.0,
fileSequence1.ts
#EXTINF:10.0,
fileSequence2.ts
#EXTINF:10.0,
fileSequence3.ts
#EXTINF:10.0,
fileSequence4.ts
```

FIG. 5

EVENT PLAYLIST UPDATED

```
#EXTM3U
#EXT-X-PLAYLIST-TYPE:EVENT
#EXT-X-TARGETDURATION:10
EXT-X-VERSION:4
#EXT-X-MEDIA-SEQUENCE:0
#EXTINF:10.0,
fileSequence0.ts
#EXTINF:10.0,
fileSequence1.ts
#EXTINF:10.0,
fileSequence2.ts
#EXTINF:10.0,
fileSequence3.ts
#EXTINF:10.0,
fileSequence4.ts // List of files between 4 and 120 go here.

EXTINF:10.0,
fileSequence120.ts
#EXTINF:10.0,
fileSequence121.ts
#EXT-X-ENDLIST
```

FIG. 6

SLIDING WINDOW PLAYLIST

```
#EXTM3U
EXT-X-TARGETDURATION:10
EXT-X-VERSION:4
#EXT-X-MEDIA-SEQUENCE:1
#EXTINF:10.0,
fileSequence1.ts
#EXTINF:10.0,
fileSequence2.ts
#EXTINF:10.0,
fileSequence3.ts
#EXTINF:10.0,
fileSequence4.ts
#EXTINF:10.0,
fileSequence5.ts
```

FIG. 7

SLIDING WINDOW PLAYLIST
UPDATED

```
#EXTM3U
EXT-X-TARGETDURATION:10
EXT-X-VERSION:4
#EXT-X-MEDIA-SEQUENCE:2
#EXTINF:10.0,
fileSequence2.ts
#EXTINF:10.0,
fileSequence3.ts
#EXTINF:10.00,
fileSequence4.ts
EXTINF:10.00,
fileSequence5.ts
EXTINF:10.0,
fileSequence6.ts
```

FIG. 8

SLIDING WINDOW PLAYLIST
UPDATED

EXTM3U
EXT-X-TARGETDURATION:10
EXT-X-VERSION:4
EXT-X-MEDIA-SEQUENCE:4
EXTINF:10.00,
fileSequence4.ts
EXTINF:10.00,
fileSequence5.ts
EXTINF:10.0,
fileSequence6.ts,
EXTINF:10.0,
fileSequence7.ts,
EXTINF:10.0,
fileSequence8.ts,
EXTINF:10.0,
fileSequence9.ts

FIG. 9

UHD HLS STREAMING TRUSTED CLIENT SERVER ENVIRONMENT

CROSS REFERENCE TO RELATED APPLICATIONS

This application claims the benefit of U.S. Provisional Patent Application Ser. No. 63/078,513 filed Sep. 15, 2020; this application claims priority to India patent application serial number 202031030760 filed Jul. 19, 2020.

BACKGROUND

The subject matter of this application relates to a trusted environment for HLS.

Cable system operators and other network operators provide streaming media to a gateway device for distribution in a consumer's home. The gateway device offers a singular point to access different types of content, such as live content, on-demand content, online content, over-the-top content, and content stored on a local or a network based digital video recorder. The gateway enables a connection to home network devices. The connection may include, for example, connection to a WiFi router or a Multimedia over Coax Alliance (MoCA) connection that provide IP over in-home coaxial cabling.

Consumers prefer to use devices that are compliant with standard protocols to access streaming video from the gateway device, so that all the devices within the home are capable of receiving streaming video content provided from the same gateway device. HTTP Live Streaming (HLS) is an adaptive streaming communications protocol created by Apple to communicate with iOS, Apple TV devices, and Macs running OSX Snow Leopard or later. HLS is capable of distributing both live and on-demand files and is the sole technology available for adaptively streaming to Apple devices.

BRIEF DESCRIPTION OF THE DRAWINGS

For a better understanding of the invention, and to show how the same may be carried into effect, reference will now be made, by way of example, to the accompanying drawings, in which:

FIG. 3 illustrates a HLS mater playlist.
FIG. 4 illustrates a HLS VOD playlist.
FIG. 5 illustrates an event playlist.
FIG. 6 illustrates an updated event playlist.
FIG. 7 illustrates a sliding window playlist.
FIG. 8 illustrates an updated sliding window playlist.
FIG. 9 illustrates a further updated sliding window playlist.

DETAILED DESCRIPTION

Figure 1:
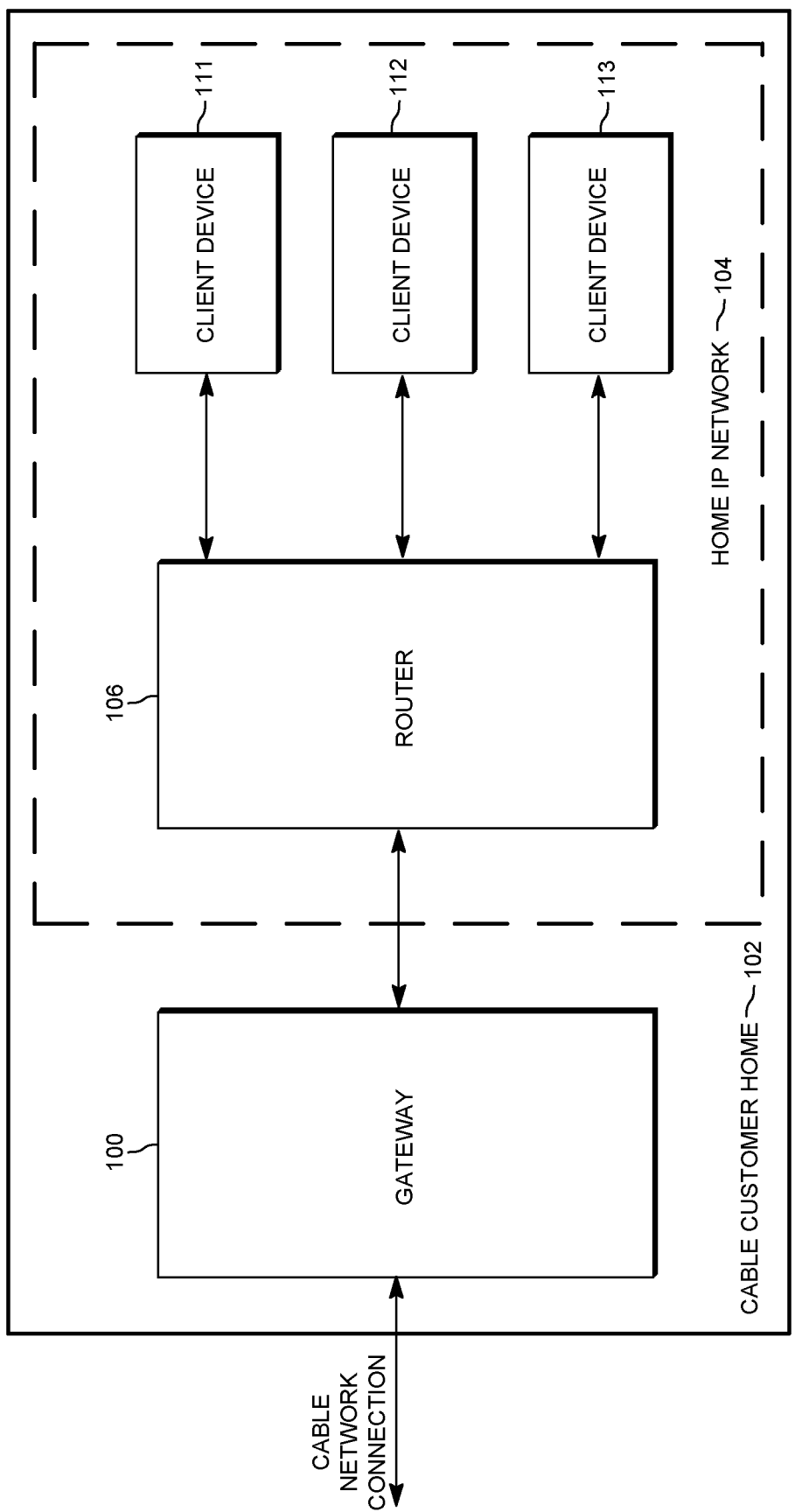
FIG. 1 illustrates an overview of a cable system.

Referring to FIG. 1, a cable system overview is illustrated with a cable network connection provided to a gateway 100 of a cable customer's home 102. The cable network connection provided to the gateway 100 may be from a cable system operator or other streaming content provider, such as a satellite system. The gateway 100 provides content to devices in a home network 104 in the consumer's home 102. The home network 104 may include a router 106 that receives IP content from the gateway 100 and distributes the content over a WiFi or a cable connection to client devices 111, 112, 113. The router 106 may be included as part of the gateway 100. In general, the cable network connection, or other types of Internet or network connection, provides streaming media content to client devices in any suitable manner. The streaming media content may be in the form of HTTP Live Streaming (HLS), Dynamic Adaptive Streaming over HTTP (DASH), or otherwise.

Figure 2:
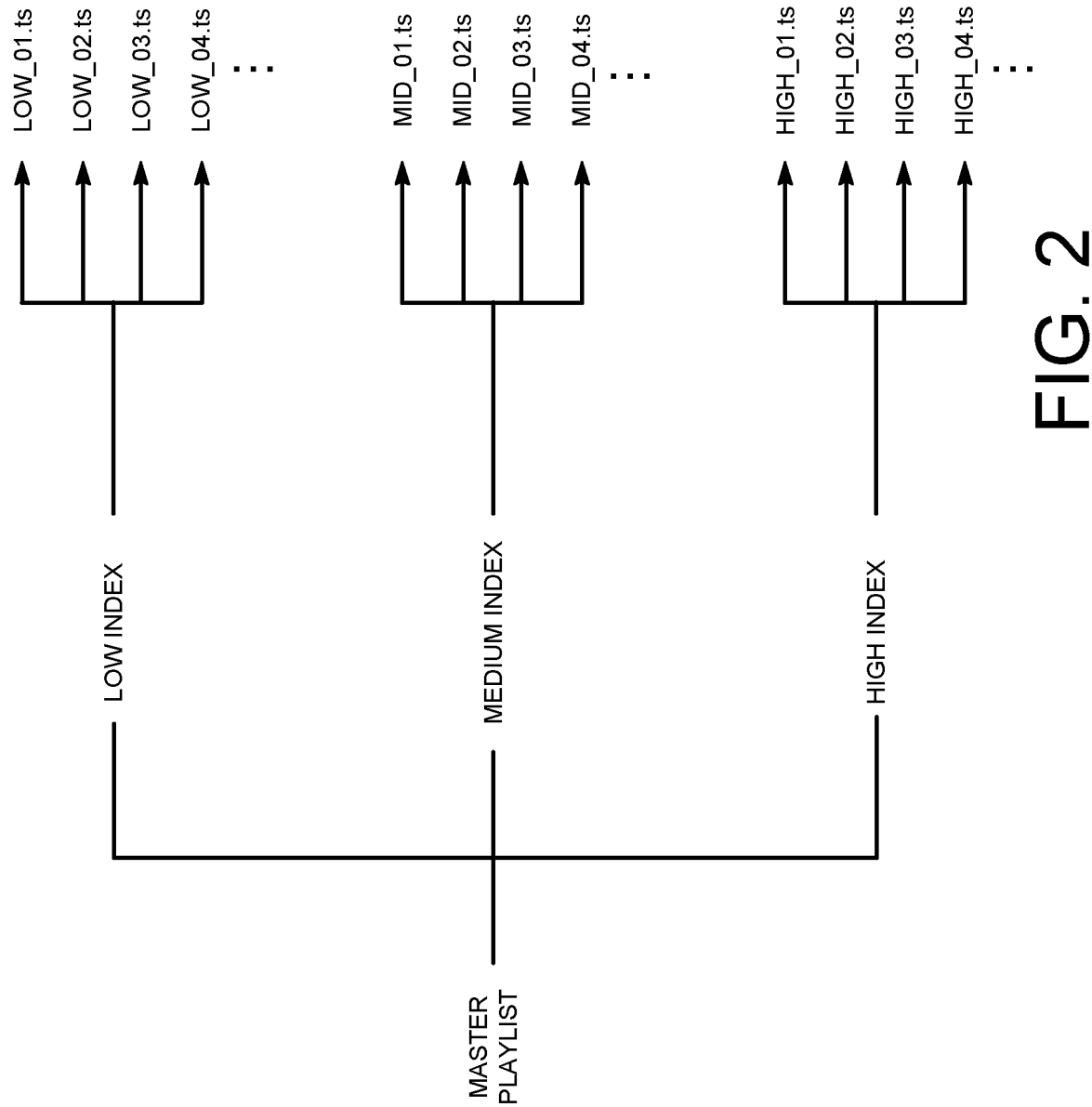
FIG. 2 illustrates HLS streaming video content.

Referring to FIG. 2, at a high level HLS enables adaptive streaming of video content, by creating multiple files for distribution to a media player, which adaptively changes media streams being obtained to optimize the playback experience. HLS is a HTTP-based technology so that no streaming server is required, so all the switching logic resides on the player. To distribute content to HLS players, the video content is encoded into multiple files at different data rates and divided into short chucks, each of which is typically between 5-10 seconds long. The chunks are loaded onto a HTTP server along with a text based manifest file with a .M3U8 extension that directs the player to additional manifest files for each of the encoded media streams. The short video content media files are generally referred to as "chunked" files.

The player monitors changing bandwidth conditions over time to the player. If the change in bandwidth conditions indicates that the stream should be changed to a different bit rate, the player checks the master manifest file for the location of additional streams having different bit rates. Using a stream specific manifest file for a selected different stream, the URL of the next chuck of video data is requested. In general, the switching between video streams by the player is seamless to the viewer.

A master playlist (e.g., manifest file) describes all of the available variants for the content. Each variant is a version of the stream at a particular bit rate and is contained in a separate variant playlist (e.g., manifest file). The client switches to the most appropriate variant based on the measured network bit rate to the player. The master playlist isn't typically re-read. Once the player has read the master playlist, it assumes the set of variants isn't changing. The stream ends as soon as the client sees the EXT-X-ENDLIST tag on one of the individual variant playlists.

For example, the master playlist may include a set of three variant playlists. A low index playlist, having a relatively low bit rate, may reference a set of respective chunk files. A medium index playlist, having a medium bit rate, may reference a set of respective chunk files. A high index playlist, having a relatively high bit rate, may reference a set of respective chunk files.

Referring to FIG. 3, an exemplary master playlist that defines five different variants is illustrated. Exemplary tags used in the master playlist may include one or more of the following.

EXTM3U: Indicates that the playlist is an extended M3U file. This type of file is distinguished from a basic M3U file by changing the tag on the first line to EXTM3U. All HLS playlists start with this tag.

EXT-X-STREAM-INF: Indicates that the next URL in the playlist file identifies another playlist file. The EXT-X-STREAM-INF tag has the following parameters.

AVERAGE-BANDWIDTH: An integer that represents the average bit rate for the variant stream.

BANDWIDTH: An integer that is the upper bound of the overall bitrate for each mediafile, in bits per second. The upper bound value is calculated to include any container overhead that appears or will appear in the playlist.

FRAME-RATE: A floating-point value that describes the maximum frame rate in a variant stream.

HDCP-LEVEL: Indicates the type of encryption used. Valid values are TYPE-0 and NONE. Use TYPE-0 if the stream may not play unless the output is protected by HDCP.

RESOLUTION: The optional display size, in pixels, at which to display all of the video in the playlist. This parameter should be included for any stream that includes video.

VIDEO-RANGE: A string with valid values of SDR or PQ. If transfer characteristic codes 1, 16, or 18 aren't specified, then this parameter must be omitted.

CODECS: (Optional, but recommended) A quoted string containing a comma-separated list of formats, where each format specifies a media sample type that's present in a media segment in the playlist file. Valid format identifiers are those in the ISO file format name space defined by RFC 6381 [RFC6381].

Referring to FIG. 4, one of the types of video playlists include a video on demand (VOD) playlist. For VOD sessions, media files are available representing the entire duration of the presentation. The index file is static and contains a complete list of URLs to all media files created since the beginning of the presentation. This kind of session allows the client full access to the entire program.

Exemplary tags used in the VOD playlist may include one or more of the following.

EXTM3U: Indicates that the playlist is an extended M3U file. This type of file is distinguished from a basic M3U file by changing the tag on the first line to EXTM3U. All HLS playlists start with this tag.

EXT-X-PLAYLIST-TYPE: Provides mutability information that applies to the entire playlist file. This tag may contain a value of either EVENT or VOD. If the tag is present and has a value of EVENT, the server must not change or delete any part of the playlist file (although it may append lines to it). If the tag is present and has a value of VOD, the playlist file must not change.

EXT-X-TARGETDURATION: Specifies the maximum media-file duration.

EXT-X-VERSION: Indicates the compatibility version of the playlist file. The playlist media and its server must comply with all provisions of the most recent version of the IETF Internet-Draft of the HTTP Live Streaming specification that defines that protocol version.

EXT-X-MEDIA-SEQUENCE: Indicates the sequence number of the first URL that appears in a playlist file. Each media file URL in a playlist has a unique integer sequence number. The sequence number of a URL is higher by 1 than the sequence number of the URL that preceded it. The media sequence numbers have no relation to the names of the files.

EXTINF: A record marker that describes the media file identified by the URL that follows it. Each media file URL must be preceded by an EXTINF tag. This tag contains a duration attribute that's an integer or floating-point number in decimal positional notation that specifies the duration of the media segment in seconds. This value must be less than or equal to the target duration.

EXT-X-ENDLIST: Indicates that no more media files will be added to the playlist file.

The VOD playlist example in FIG. 4 uses full pathnames for the media file playlist entries. While this is allowed, using relative pathnames is preferable. Relative pathnames are more portable than absolute pathnames and are relative to the URL of the playlist file. Using full pathnames for the individual playlist entries often results in more text than using relative pathnames.

Referring to FIG. 5, an event playlist is specified by the EXT-X-PLAYLIST-TYPE tag with a value of EVENT. It doesn't initially have an EXT-X-ENDLIST tag, indicating that new media files will be added to the playlist as they become available.

Exemplary tags used in the EVENT playlist may include one or more of the following.

EXTM3U: Indicates that the playlist is an extended M3U file. This type of file is distinguished from a basic M3U file by changing the tag on the first line to EXTM3U. All HLS playlists start with this tag.

EXT-X-PLAYLIST-TYPE: Provides mutability information that applies to the entire playlist file. This tag may contain a value of either EVENT or VOD. If the tag is present and has a value of EVENT, the server must not change or delete any part of the playlist file (although it may append lines to it). If the tag is present and has a value of VOD, the playlist file must not change.

EXT-X-TARGETDURATION: Specifies the maximum media-file duration.

EXT-X-VERSION: Indicates the compatibility version of the playlist file. The playlist media and its server must comply with all provisions of the most recent version of the IETF Internet-Draft of the HTTP Live Streaming specification that defines that protocol version.

EXT-X-MEDIA-SEQUENCE: Indicates the sequence number of the first URL that appears in a playlist file. Each media file URL in a playlist has a unique integer sequence number. The sequence number of a URL is higher by 1 than the sequence number of the URL that preceded it. The media sequence numbers have no relation to the names of the files.

EXTINF: A record marker that describes the media file identified by the URL that follows it. Each media file URL must be preceded by an EXTINF tag. This tag contains a duration attribute that's an integer or floating-point number in decimal positional notation that specifies the duration of the media segment in seconds. This value must be less than or equal to the target duration.

Items are not removed from the playlist when using the EVENT tag; rather new segments are appended to the end of the file. New segments are added to the end of the file until the event has concluded, at which time the EXT-X-ENDLIST tag may be appended. Referring to FIG. 6, the same playlist is shown after it's been updated with new media URIs and the event has ended. Event playlists are typically used when you want to allow the user to seek to any point in the event, such as for a concert or sports event.

Referring to FIG. 7, a live playlist (sliding window) is an index file that is updated by removing media URIs from the file as new media files are created and made available. The EXT-X-ENDLIST tag isn't present in the live playlist, indicating that new media files will be added to the index file as they become available.

Exemplary tags used in the live playlist may include one or more of the following.

EXTM3U: Indicates that the playlist is an extended M3U file. This type of file is distinguished from a basic M3U file by changing the tag on the first line to EXTM3U. All HLS playlists must start with this tag.

EXT-X-TARGETDURATION: Specifies the maximum media-file duration.

EXT-X-VERSION: Indicates the compatibility version of the playlist file. The playlist media and its server must comply with all provisions of the most recent version of the IETF Internet-Draft of the HTTP Live Streaming specification that defines that protocol version.

EXT-X-MEDIA-SEQUENCE: Indicates the sequence number of the first URL that appears in a playlist file. Each media file URL in a playlist has a unique integer sequence number. The sequence number of a URL is higher by I than the sequence number of the URL that preceded it. The media sequence numbers have no relation to the names of the files.

EXTINF: A record marker that describes the media file identified by the URL that follows it. Each media file URL must be preceded by an EXTINF tag. This tag contains a duration attribute that's an integer or floating-point number in decimal positional notation that specifies the duration of the media segment in seconds. This value must be less than or equal to the target duration. In addition, the live playlist can use an EXT-X-ENDLIST tag to signal the end of the content. Also, the live playlist preferably does not include the EXT-X-PLA YLIST-TYPE type.

Referring to FIG. 8, the same playlist of FIG. 7 is shown after it has been updated with new media URls.

Referring to FIG. 9, the playlist FIG. 8 continues to be updated as new media URls are added.

In many video streaming technologies, including MPEG-2, the video frames are encoded as a series of frames to achieve data compression and typically provided using a transport stream. Each of the frames of the video are typically compressed using either a prediction based technique and a non-prediction based technique. An I frame is a frame that has been compressed in a manner that does not require other video frames to decode it. AP frame is a frame that has been compressed in a manner that uses data from a previous frame(s) to decode it. In general, a P frame is more highly compressed than an I frame. AB frame is a frame that has been compressed in a manner that uses data from both previous and forward frames to decode it. In general, a B frame is more highly compressed than a P frame. The video stream is therefore composed of a series ofl, P, and B frames. MPEG-2 is described in ISO/IEC 13818-2:2013 "Information technology—Generic coding of moving pictures and associated audio information—Part 2: Video" incorporated by reference herein in its entirety. In some encoding technologies, including H.264, an IDR (instantaneous decoder refresh) frame is made up an intra code picture that also clears the reference picture buffer. In some encoding technologies, the granularity of the prediction types may be brought down to a slice level, which is a spatially distinct region of a frame that is encoded separately from any other regions in the same frame. The slices may be encoded as I-slices, P-slices, and B-slices in a manner akin to I frames, P-frames, and B-frames. In addition, the video may be encoded as a frame or a field, where the frame is a complete image and a field is a set of odd numbered or even numbered scan lines composing a partial image. However, for purposes of discussion both "frames" and "pictures" and "fields" are referred to herein as "frames". H.264 is described in ITU-T (2019) "SERIES H: AUDIOVISUAL AND MULTIMEDIA SYSTEMS Infrastructure of audiovisual services—Coding of moving video", incorporated by reference herein in its entirety.

Digital content distribution is evolving and advancing at a rapid pace. The content creators are providing their content as increasingly higher definition content, which is approaching the quality of the source material. One of the higher definition content resolutions is generally referred to as 4K resolution. 4K resolution refers to a horizontal display resolution of approximately 4000 pixels. In the television and consumer media applications, 3840×2160 (4K UHD) is a typical resolution, while 4096×2160; 3996×2160; 4096×1716 (DCI 4K) is a typical resolution for movie projection. Even higher resolutions are being provided, including 7680×4320 for 8K. With the advancement in distribution of such higher quality content it is increasingly important to provide an environment that safeguards the content from being unlawfully reproduced and redistributed. In this regard, it is desirable to include increasingly sophisticated content protection to protect such higher quality content. While such content protection techniques should be implemented in a video player capable of decoding and rendering such content, it should be done in a manner that is transparent to the user.

The video player should be selectively operated in a trusted execution environment which may be a secure area of a processor. It provides protection that the code and data loaded inside the processor is protected with respect to confidentiality and integrity. The trusted execution environment may also provide security features, such as isolated execution, integrity of applications executing therein, along with confidentiality of their assets. In general, the trusted execution environment offers an execution space that provides a higher level of security for trusted applications than a rich operating system having more functionality. By way of example, ARM TrustZone Trusted Execution Environment is one implementation of a trusted execution environment.

The trusted execution environment may include digital rights management in the form of hack one, only hack one. This provides that the security on one video player is limited to that video player. Also, a compromise of security on one distribution of video content is limited to that distribution. This may be achieved by binding to the video player. The video player may bind the ability to decrypt a license key to a particular video player. License keys may be encrypted such that they cannot be decrypted without the keys of the individual player for which the license was issued. The compromise of the keys for a set of devices may not make it easier to derive the keys for another video player. This may further be achieved by software diversity. Security related software may be implemented in diverse ways so that an attack is unlikely to be portable. This diversity may vary by version of the video player. This may even further be achieved by copy and title diversity. The content protection system may provide capabilities so that in the event of a breach on one video or version of a video, additional work is needed to breach the content protection on a next video or another version. It is noted that simply using different content keys is not considered sufficient to satisfy this requirement.

The trusted execution environment may include digital rights management in the form of output and link protection. The video player may support HDCP (high bandwidth digital content protection) 2.2 or better for specific content types, such as 4K or greater. The video player may support HDCP 2.2 or better by the content provider, e.g., in the license. When HDCP 2.2 or better is required by the content, the requirement may be enforced on downstream link protective devices, e.g., using a Type I flag in HDCP. The video player may have the ability to acquire link protection revocation lists and/or query a server to determine when compromised or non-compliant link protection devices are present and then security limit what content can be played. The video player may allow other available outputs and their associated protection to be selectable by the content provider, e.g., in the license.

The trusted execution environment may include a video player platform requirement in the form of a hardware root of trust. The video player may support a secure chain of trust for code that executes in the secured execution environment. The root of this trust may be securely provisioned, e.g., permanently factory burned. The video player may provide a secure mechanism for digital rights management systems to store secrets in local, persistent storage in a form encrypted uniquely for the device and, if the platform supports multiple trusted applications or digital rights managements, uniquely for each in a way that securely provides a trusted application from decrypting the secrets of others. The encryption may be rooted in a secret, immutable, device-unique value with at least 128 bits of entropy.

The trusted execution environment may include an end to end system specification in the form of the video player includes forensic watermarking. The system may have the ability to securely forensically mark video at the server and/or client to recover information suitable to address breaches. The watermark may be robust against corruption of the forensic information, including collusion attacks, and transformations and capture techniques that leave the contents still watchable. The watermark may be inserted on the server or on the client such that the valid insertion is guaranteed during playback even if the device and its secrets are compromised.

Other specifications may be included as desired, including those described in "MovieLabs Specification for Enhanced Content Protection—Version 1.2", incorporated by reference herein in its entirety.

To enable decrypting, decoding and rendering of content on the video player, especially for a video player suitable for HLS video streaming for a trusted execution environment, is problematic in properly handling legacy content that does not require a trusted execution environment or if the device lacks a suitable trusted execution environment for the higher definition content. One of the principal challenges in HLS streaming systems is that the video player is not aware ahead of time whether a secure video path is necessary for a particular video content. As a result, the content providers are challenged to provide video streaming with confidence that the video player is making best efforts to incorporate the desired robustness settings to protect the video content. In this manner, the content provider needs confidence that the video player will be making best efforts to incorporate sufficient robustness settings to protect the video content, while not being aware ahead of time whether the secure video path is available, that provides both the trusted execution environment for selected content and the non-trusted execution environment for other content.

In general, it is undesirable for the video player to download the entire video stream, or a portion thereof, to interpret the approximate configuration to determine whether the video content should be decrypted, decoded, and rendered. Accordingly, it is desirable to have the video player determine if it has suitable characteristics to receive, decrypt, decode, and render such content in a manner consistent with the intended trusted characteristics prior to receiving the video content itself In this manner, the content creators can be more confident that their content will be protected by the video player and the system as a whole. The intended trusted characteristics may be a trusted execution environment with suitable characteristics together with a non-trusted execution environment. To achieve such an environment, it is desirable to provide the HLS video content within an environment that allows for sufficient security. Similarly, it is desirable that the video player can provide the trusted execution environment within the constructs provided by HLS video streaming.

Figure 10:
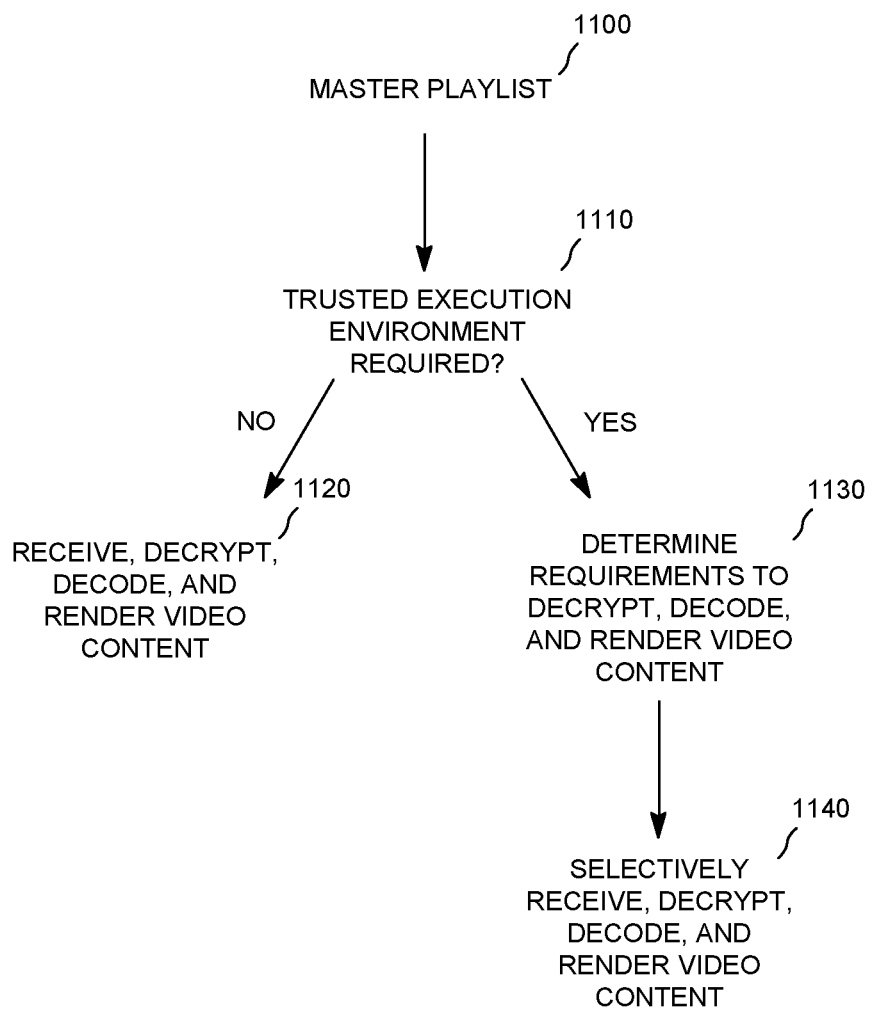
FIG. 10 illustrates use of a master playlist for a trusted execution environment.

Referring to FIG. 10, the video player receives the master playlist 1100 for the HLS video stream and determines the system requirements in order to decrypt, decode, and render the video content. For video content that is not required to be decrypted, decoded, and/or rendered using a trusted execution environment 1110, the video player receives the video content and decrypts, decodes, and renders it in a normal manner 1120. For video content that is required to be decrypted, decoded, and/or rendered using a trusted execution environment 1130, the master playlist should be interpreted to determine the particular requirements required in order to decrypt, decode, and/or render the video content. The particular requirements may include, at least in part, one or more of (1) hack one, only hack one, (2) output and link protection, (3) hardware root of trust, and (4) forensic watermarking. If the requirements are not met then the video is not received, such as any chunk files. If the requirements are met then the content is received, decrypted, decoded, and rendered 1140.

Figure 11:
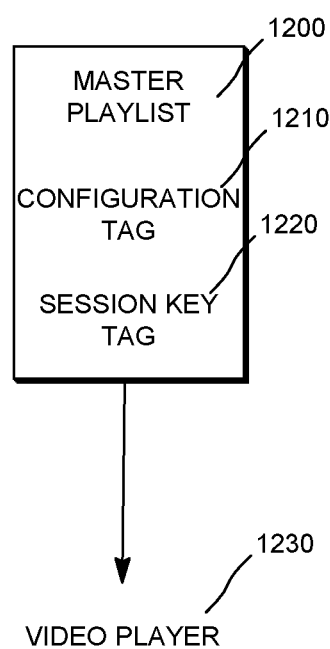
FIG. 11 illustrates a video player using a master playlist with a configuration tag and a session key tag.

Referring to FIG. 11, preferably the master playlist 1200 is provided with a configuration tag 1210 along with a session key tag 1220 to supply the information to the video player to enable the video player 1230 to set up the desired trusted execution environment as indicated by the tag(s). In addition, the individual variant streams may still be described with respective "stream" tags. In this manner, the video player would also be able to select the desired variant to initially pick and provide the user with an indication about the desirability to upgrade the video player or otherwise fallback to a lower bitrate variant, if one is available.

For example, the session key tag may be an EXT-X-SESSION-KEY tag that allows encryption keys from media playlists to be specified in a master playlist. This allows the video player to preload these keys without having to read the media playlist(s) first. The format may be #EXT-X-SESSION-KEY:<attribute-list>. All attributes defined for the EXT-X-KEY tag may also be defined for the EXT-X-SESSION-KEY, except that the value of the METHOD attribute should not be NONE. If an EXT-X-SESSION-KEY is used, the values of the METHOD, KEYFORMAT, and KEYFORMATVERSIONS attributes should match any EXT-X-KEY with the same URI value. EXT-X-SESSION-KEY tags should be added if multiple variant streams or renditions use the same encryption keys and formats. An EXT-X-SESSION-KEY tag should not be associated with any particular media playlist. A master playlist should not contain more than one EXT-X-SESSION-KEY tag with the same METHOD, URI, IV, KEYFORMAT, and KEYFORMATVERSION attribute values. The EXT-X-SESSION-KEY tag may be optional.

Media Segments may be encrypted. The EXT-X-KEY tag specifies how to decrypt them. It preferably applies to every media segment and to every media initialization section declared by an EXT-X-MAP tag that appears between it and the next EXT-X-KEY tag in the playlist file with the same KEYFORMAT attribute (or the end of the playlist file). Two or more EXT-X-KEY tags with different KEYFORMAT attributes may apply to the same media segment if they ultimately produce the same decryption key. The format may be #EXT-X-KEY: <attribute-list>.

The following attributes may be defined:

Method

The value is an enumerated-string that specifies the encryption method. This attribute is preferably required. The methods defined may be: NONE, AES-128, and SAMPLE- AES. An encryption method of NONE means that media segments are not encrypted. If the encryption method is NONE, other attributes are preferably not present. An encryption method of AES-128 signals that media segments are completely encrypted using the Advanced Encryption Standard (AES) with a 128-bit key, Cipher Block Chaining (CBC), and Public-Key Cryptography Standards #7 padding. CBC is restarted on each segment boundary, using either the initialization vector (IV) attribute value or the media sequence number.

An alternative to whole-segment encryption is sample encryption. With sample encryption, only media sample data—such as audio packets or video frames—is preferably encrypted. The rest of the media segment is preferably unencrypted. Sample encryption allows parts of the segment to be processed without (or before) decrypting the media itself An encryption method of SAMPLE-AES means that the media segments are sample encrypted using the advanced encryption standard. How these media streams are encrypted and encapsulated in a segment depends on the media encoding and the media format of the segment. fMP4 Media Segments are encrypted using the 'cbcs' scheme of common encryption. Encryption of other media segment formats containing H.264, AAC, AC-3, and Enhanced AC-3 media streams may be used. The IV attribute may be present.

URI

The value is a quoted-string containing a URI that specifies how to obtain the key. This attribute is preferably required unless the METHOD is NONE.

IV

The value is a hexadecimal-sequence that specifies a 128-bit unsigned integer initialization vector to be used with the key. Use of the IV attribute preferably require a compatibility version number of 2 or greater.

Keyformat

The value is a quoted-string that specifies how the key is represented in the resource identified by the URI. This attribute is preferably optional; its absence indicates an implicit value of "identity". Use of the KEYFORMAT attribute preferably requires a compatibility version number of 5 or greater.

Keyformatversions

The value is a quoted-string containing one or more positive integers separated by the "/" character (for example, "1", "1/2", or "1/2/5"). If more than one version of a particular KEYFORMAT is defined, this attribute can be used to indicate which version(s) this instance complies with. This attribute is preferably optional; if it is not present, its value is considered to be "1". Use of the KEYFORMAT-VERSIONS attribute preferably requires a compatibility version number of 5 or greater.

If the media playlist file does not contain an EXT-X-KEY tag, then media segments are preferably not encrypted.

The configuration tag may be EXT-X-CLIENT-CONFIG which is provided in the master playlist along with the EXT-X-SESSION-KEY. The configuration tag provides complete information that the video player may require for configuring its media player for the trusted execution environment. While the configuration tag captures a super set of the attributes for all the potential variant streams, the individual variant stream are preferably still described more precisely with respective EXT-X-STREAM-INF tags.

The #EXT-X-CLIENT-CONFIG:<attribute-list> tag may include the following attributes.

Container

The value is an enumerated-string that specifies the media segment container format type used within the session. This attribute is optional.

The defined containers may include: MPEG2-TS, CMAF-tMP4, MIXED.

With no explicit CONTAINER specified, it is assumed to be MPEG2-TS.

Codecs

The value is a quoted string that indicates all the codec types, both video and audio, that media segments could use within the session. The accepted values and other details of definitions are the same as CODECS attribute EXT-X-STREAM-INF tag. See, "HTTP Live Streaming 2nd Edition draft-pantos-hls-rfc8216bis-01", Jun. 8, 2018, incorporated by reference herein in its entirety. See, "The 'Codecs' and 'Profiles' Parameters for "Bucket" Media Types", ISSN: 2070-1721, August 2011, incorporated by reference herein in its entirety.

Video Resolutions

The value is quoted string containing comma separated list of consolidated video resolutions that variant streams would offer within the session.

Resolution Robustness

The value is a quoted string containing ordered pair of resolutions and associated robustness levels. This can contain the robustness levels as illustrated below:

| Definition | Intent |
| --- | --- |
| DECRYPT_DECODE_SW | Players which do not have hardware assisted trusted execution environment can use software based solution |
| DECRYPT_HW | Players to use hardware trusted execution environment for decryption only |
| DECRYPT_DECODE_HW | Players to use hardware trusted execution environment for decryption and decoding, aka full secure video path |

It is noted that this attribute is optional and when not specified, it is assumed that any robustness level is acceptable.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. A method for a video player to play a video stream comprising:
   receiving a master playlist identifying at least one variant playlist identifying a video file encoded as a series of video frames that when decoded provide said video stream;
   selectively determining whether said video file is to be processed in a trusted execution environment based upon a configuration tag in said master playlist;
   wherein said trusted execution environment of said video player selectively includes,
      (i) hack one, only hack one which includes binding an ability to decrypt a license key to a particular said video player;
      (ii) output and link protection;
      (iii) hardware root of trust; and
      (iv) forensic watermarking;
   decrypting and/or decoding said video stream in said trusted execution environment that includes (i) hack one, only hack one; (ii) output and link protection; (iii) hardware root of trust; and (iv) forensic watermarking.

2. The method of claim 1, wherein said trusted execution environment includes an execution space that provides a higher level of security for selected applications than would otherwise be available.

3. The method of claim 1, further comprising said video player receiving said video file over a cable network.

4. The method of claim 1, wherein said video file is provided as a HTTP live streaming video stream.

5. The method of claim 1, wherein a resolution of said video file is at least 4K.

6. The method of claim 1, wherein a secure area of a processor comprises said trusted execution environment.

7. The method of claim 1, wherein said trusted execution environment includes at least one of:
   said output and link protection which includes high bandwidth digital content protection 2.2 or better;
   said hardware root of trust which supports a secure chain of trust for code; and
   said hardware root of trust which include encryption rooted in a secret, immutable, device-unique value with at least 128 bits of entropy.

8. The method of claim 1, wherein said trusted execution environment includes said forensic watermarking which is robust against corruption.

9. The method of claim 1, wherein said trusted execution environment includes digital rights management in the form of the hack one, only hack one, the output and the link protection, hardware root of trust; and forensic watermarking.

10. The method of claim 1, wherein said video player based upon a lack of said configuration tag in said master playlist not processing said video files using said trusted execution environment.

11. The method of claim 1, wherein said master playlist further includes an EXT-X-SESSION-KEY tag that is used in combination with said configuration tag in said determining whether said video file is to be processed in said trusted execution environment.

12. The method of claim 1, wherein said configuration tag is a EXT-X-CLIENT-CONFIG tag.

13. The method of claim 1, wherein said configuration tag includes information for configuring its media player for said trusted execution environment.

14. The method of claim 13, wherein said configuration tag includes a container attribute specifying a media segment container format type.

15. The method of claim 13, wherein said configuration tag includes a codecs attribute that indicates all codec types that media segments could use.

16. The method of claim 13, wherein said configuration tag includes a video resolutions attribute that indicates a list of video resolution that variant streams would offer.

17. The method of claim 13, wherein said configuration tag includes a resolution robustness attribute that indicates an ordered pair of resolutions and associated robustness levels.

18. The method of claim 17, wherein one of said associated robustness levels includes video players which do not have hardware assisted said trusted execution environment can use a software based trusted execution environment.

19. The method of claim 17, wherein one of said associated robustness levels includes video players must only use hardware based said trusted execution environment for decryption.

20. The method of claim 17, wherein one of said associated robustness levels includes video players must only use hardware based said trusted execution environment for decryption and decoding.

* * * * *